(12) United States Patent
Sakuma et al.

(10) Patent No.: US 7,279,349 B2
(45) Date of Patent: Oct. 9, 2007

(54) SEMICONDUCTOR OPTICAL DEVICE AND MANUFACTURING METHOD THEREOF

(75) Inventors: Yasushi Sakuma, Tokyo (JP); Katsuya Motoda, Yokohama (JP); Kenji Uchida, Yokohama (JP); Ryu Washino, Chigasaki (JP)

(73) Assignee: OpNext Japan, Inc., Kanagawa (JP)

( * ) Notice: Subject to any disclaimer, the term of this patent is extended or adjusted under 35 U.S.C. 154(b) by 48 days.

(21) Appl. No.: 11/031,003

(22) Filed: Jan. 10, 2005

(65) Prior Publication Data
US 2005/0286828 A1 Dec. 29, 2005

(30) Foreign Application Priority Data
Jun. 28, 2004 (JP) ............................. 2004-189231

(51) Int. Cl.
*H01L 21/00* (2006.01)
*H01L 21/311* (2006.01)
(52) U.S. Cl. .................. 438/31; 438/39; 438/694; 438/725
(58) Field of Classification Search ............. 438/694, 438/706, 725, 727, 729, 31, 39; 216/67, 216/71
See application file for complete search history.

(56) References Cited

U.S. PATENT DOCUMENTS

| 4,482,419 A * | 11/1984 | Tsukada et al. ........ 156/345.31 |
| 6,773,945 B2 * | 8/2004 | Yamada .................... 438/31 |
| 6,828,243 B2 * | 12/2004 | Denpoh ................... 438/706 |

FOREIGN PATENT DOCUMENTS

JP 3-177020 8/1991

* cited by examiner

*Primary Examiner*—Hsien-Ming Lee
(74) *Attorney, Agent, or Firm*—Mattingly, Stanger, Malur & Brundidge, P.C.

(57) ABSTRACT

In a dry etching step for an organic material film, a fluorine-containing member is disposed to the periphery of a semiconductor substrate disposed on a lower electrode or a tray for wafer transportation to form fluorine (fluoro-radicals) from the member per se in addition to the fluoric gas added to the etching gas, with a purpose of removing reaction products, thereby removing reaction products deposited on the semiconductor substrate efficiently and stably.

9 Claims, 8 Drawing Sheets

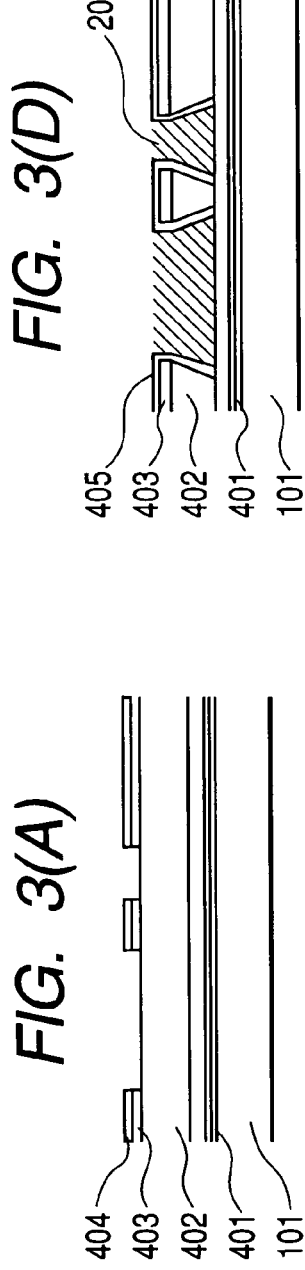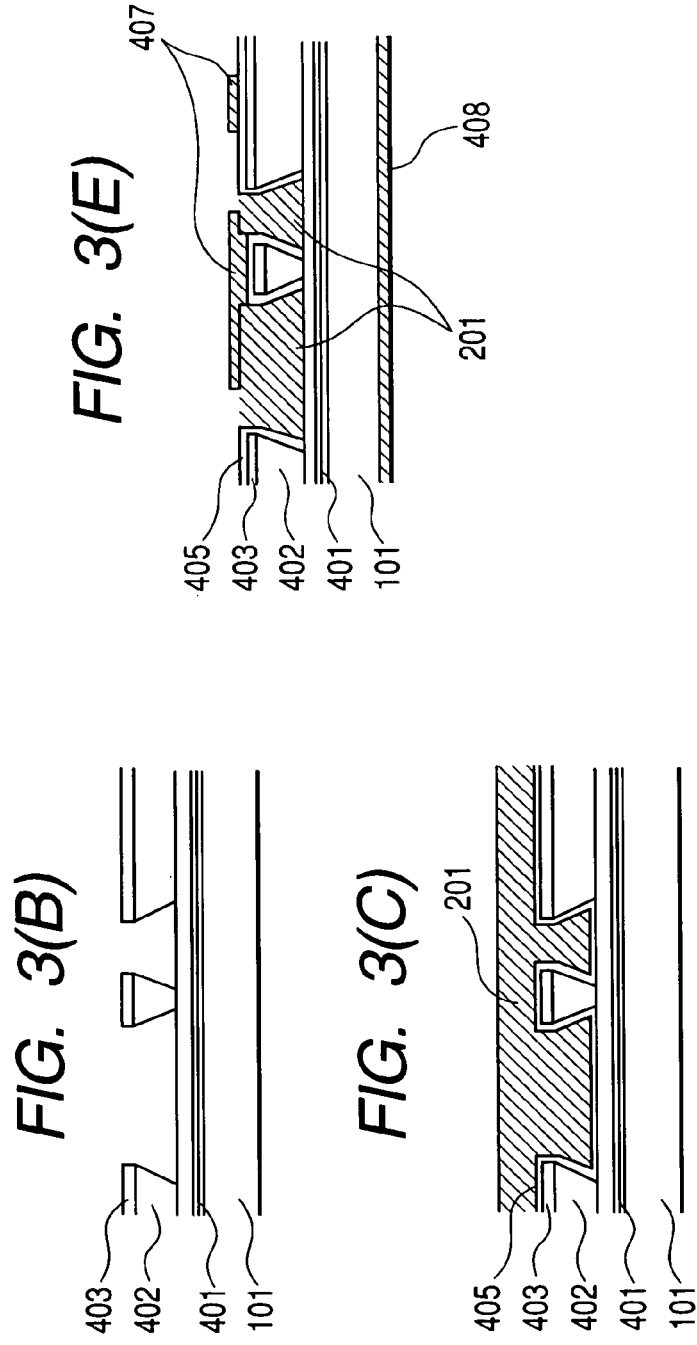

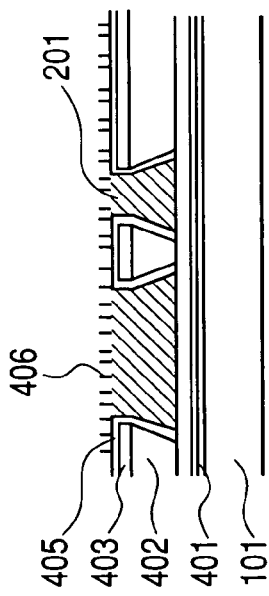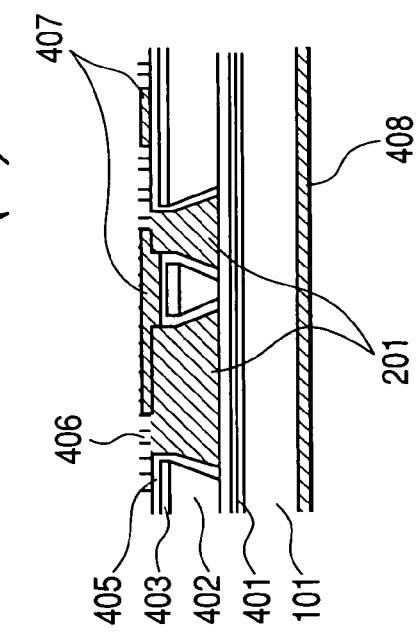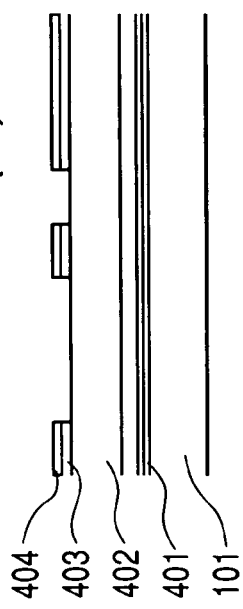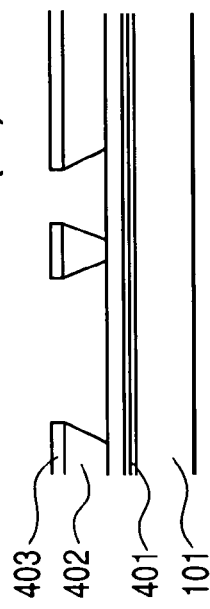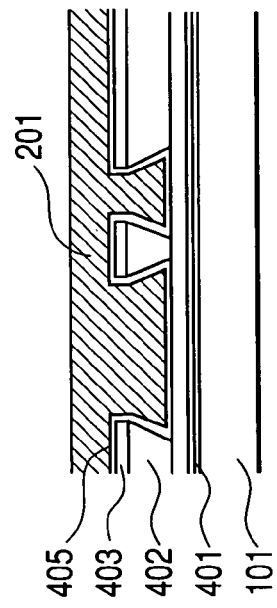

SEMICONDUCTOR OPTICAL DEVICE AND MANUFACTURING METHOD THEREOF

CLAIM OF PRIORITY

The present application claims priority from Japanese Application JP 2004-189231 filed on Jun. 28, 2004, the content of which is hereby incorporated by reference into this application.

BACKGROUND OF THE INVENTION

1. Field of the Invention

The present invention concerns a semiconductor optical device in the field of optical communication and the like, as well as a manufacturing method thereof.

2. Related Background Art

In recent years, increase for the transmission speed of optical communication has bee progressed. In order to attain a semiconductor optical device at a transmission speed exceeding 10 Gbit/s, it is important to decrease the parasitic capacitance pertaining to the semiconductor optical device.

Description is to be made to an existent structure of a semiconductor optical device and a manufacturing method thereof. A semiconductor laser at a transmission speed 10 Gbit/s has, as shown in FIG. 10, a semiconductor mesa formed on an InP substrate 101, in which both sides of the semiconductor mesa are buried with an Fe-InP semiconductor 102 for planarization. Since the growth in burying is conducted usually at a high temperature of about 600° C., thermal diffusion 103 of a dopant (for example, Zn) from the semiconductor mesa portion to the Fe-InP layer 102 occurs. Further, a pad electrode 104 is formed on the Fe-InP semiconductor 102 with a dielectric constant of 12.6. Therefore, the parasitic capacitance is formed of PIN junction capacitance 105, diffusion capacitance 106 on both sides of the cross sectional shape inverted mesa (inverted trapezoidal) and a pad capacitance 107.

In order to decrease the parasitic capacitance pertaining to the semiconductor optical device, it has been proposed a ridge structure in which both sides of the inverted mesa cross sectional structure are buried with a polyimide resin 201 with a dielectric constant of 3.6. Since the structure is free of the thermal diffusion 103 of the dopant and the pad electrode 104 is formed on the polyimide 201 of low dielectric constant, the parasitic capacitance can be decreased greatly.

The polyimide resin on both sides of the mesa cross sectional structure is planarized by an etching back method using a dry etching apparatus. The etching back method is one of dry etching methods, which is a technique of planarizing the unevenness on the surface of a semiconductor substrate only due to the directionality of dry etching without using a mask material such as a resist.

FIG. 12 shows a flow of manufacturing an InP series ridge waveguide channel type semiconductor laser in which the both sides of the ridge are buried with a polyimide resin 201. FIG. 13 shows an existent dry etching apparatus used for manufacturing the flow shown in FIG. 12.

At first, after forming a multi-layered structure comprising an active layer 401, an InP clad layer 402 and a contact layer 403 on an InP substrate 101 for forming an optical waveguide channel, the contact layer 403 is fabricated into a stripe structure with a stripe width of 2.0 μm and a trench width of 10 μm on both sides of the stripe by using a CVD oxide film of 100 nm (hereinafter referred to as an SiO₂ film) 404 (FIG. 12(A)). Successively, the InP clad layer 402 is etched by using wet etching with a liquid mixture of hydrochloric acid and phosphoric acid to form a ridge waveguide channel of an inverted mesa cross sectional shape as shown in FIG. 12(B). Then, a passivation film 405 of 0.5 μm thickness is formed over the entire substrate by a CVD method. Then, a polyimide resin 201 is coated over the entire substrate (FIG. 12(C)).

Then, a dry etching apparatus shown in FIG. 13 is used and the polyimide resin 201 in the trenches on both sides of the ridge is planarized and, at the same time, the polyimide resin 201 in the portions other than the trenches on both sides of the ridge waveguide channel is completely removed by an etching back method using an oxygen-argon gas mixture with addition of a fluoric gas (FIG. 12(D)).

The dry etching apparatus shown in FIG. 13 has a reaction chamber 501 installed therein, which has a lower electrode 504 that also serves as a holder for a tray 503 for transportation of a semiconductor substrate 502 or a wafer and an upper electrode 505 opposed to the lower electrode 504. The lower electrode 504 and the upper electrode 505 are used as electrodes for applying power that apply an RF power or DC power to a reaction gas introduced between both of the electrodes to convert the gas into plasmas. In the illustrated embodiment, an RF supply source 507 is connected to the lower electrode 504 by way of a matching box 506. An exhaustion device 509 connected with an exhaustion pump by way of an on-off valve 508 is laid in the reaction chamber 501, and a pipeline of a gas supply portion is connected. The gas supply portion contains an oxygen reservoir 512, an argon reservoir 213 and a fluoric gas reservoir 514 for supplying a required amount of reaction gas by way of gas flow meters 510 and on-off valves 511. Further, the gas reservoirs are installed in a cylinder cabinet for safety. Further, the reaction chamber 501 is provided with a preparatory chamber 515 for transportation of wafers which can transport wafers without exposing the reaction chamber 501 to atmospheric air.

Then, the passivation film 405 in the current injection region ridge waveguide channel is removed. In this case, if needle-like reaction products 406 remain over the contact layer, they cause uneven etching to increase the device resistance. Then, an upper electrode 407 of about 1 μm thickness comprising Ti/Pt/Au is formed by an EB vapor deposition method. Then, after pattering the upper electrode 407 by ion milling, it is passed through steps such as rear face polishing, formation of the lower electrode 408 and electrode alloying (FIG. 12(E)). After passing the steps described above, the wafer is cleaved in a bar shape with a 200 μm cavity and, after forming a reflection protective film on the cleaved surface, it is separated into devices each in chip-like shape.

On the other hand, Japanese Laid-Open Patent No. H 3(1991)-177020 discloses to form a cover material that shields the electrode for mounting a work from energy rays in an etching apparatus with a fluorine-containing resin such as teflon (registered trademark) thereby increasing the etching rate speed of SiO₂ series films.

SUMMARY OF THE INVENTION

Generally, it has been known that reaction products formed during etching are deposited to the surface of a semiconductor substrate or a mask material after the completion of the etching in the dry etching method, and a post treatment such as oxygen plasma ashing or immersion in concentrated sulfuric acid (wet etching) is conducted after the completion of the etching to remove reaction products on the semiconductor substrate in the dry etching for semiconductor crystals or oxide films.

On the other hand, in an etching back method for an organic material film, when an oxygen plasma ashing or immersion in concentrated sulfuric acid (wet etching) used for the removal of reaction products is conducted, the organic material film itself is etched isotropically making it impossible for planar burying. Accordingly, it is difficult to remove reaction products after the completion of the etching, and reaction products remain on the polyimide resin on the mesa portion above the semiconductor substrate and under the pad electrode to cause failure of contact resistance and lower the reliability.

For the countermeasure of the problem, as a method of removing reaction products in the dry etching, a method of adding a slight amount of a fluorocarbon gas (hereinafter referred to as a fluoric gas) in addition to an oxygen/argon gas mixture which is a main etching gas in a dry etching apparatus and reacting silicon and fluorine in the reaction products to remove them in the form of SiFx has been used.

Control for the amount of the reaction product formed is difficult and it is necessary to increase the addition amount of the fluoric gas for complete removal. In this case, since there is a problem that an oxide film used as the surface protective film for the semiconductor substrate is etched, the reaction products deposited on the semiconductor substrate can not be removed uniformly only by the method of using the fluoric gas to cause failure of the contact resistance and lowering of the yield due to the lowering of the reliability. That is, in a semiconductor optical device manufactured by the method using the fluoric gas, the reaction products 406 remain as they are on the contact layer 403 and the polyimide resin 201 in a portion of the semiconductor substrate (FIG. 12(D)), so that no sufficient contact can be made relative to the upper electrode 407 to lower the yield such as failure of the threshold value or lowering of the reliability due to the increase of the device resistance.

Further, this method involves a problem of requiring provision of a gas supply portion such as a cylinder cabinet, gas reservoirs, gas flow meters and on-off valves to increase the manufacturing cost. Further, the fluoric gas is a so-called green house gas having a high anathermal coefficient, and a fluoric gas remained not being separated in the plasmas is released into atmospheric air without being removed completely to cause one of factors for global warming.

On the other hand, studies have not been made for the technique described in the Japanese Laid-Open Patent No. H 3(1991)-177020 on the etching in the cause of manufacturing a semiconductor optical device containing an organic material film in a portion of the constitution.

Accordingly, it is the main object of the present invention to provide a manufacturing method capable of providing a high quality semiconductor optical device containing an organic material film in a portion of the constitution by removing reaction products on a semiconductor substrate efficiently, simply and stably in the method of manufacturing the semiconductor optical device.

For attaining the object, a method of manufacturing a semiconductor optical device according to the invention comprises the steps of forming a ridge waveguide channel on a semiconductor substrate, forming a passivation film on the semiconductor substrate including the ridge waveguide channel, forming an organic material film on the passivation film, placing the semiconductor substrate on a lower electrode of a dry etching apparatus, removing the organic material film in the portions other than the trenches of the ridge waveguide channel by etching and, simultaneously, removing reaction products deposited on the semiconductor substrate by fluoro-radicals formed in the plasmas accompanying the removal of the organic material film from the fluorine-containing member situated to the outer periphery of the substrate mounting surface of the lower electrode, removing the passivation film by dry etching succeeding to the step of removing the organic material film and forming an electrode in a region from which the passivation film has been removed.

In the manufacturing method of the semiconductor optical device according to the invention, a fluorine-containing member is disposed previously to the periphery of a lower electrode of a dry etching apparatus or a semiconductor substrate disposed on a tray for wafer transportation (hereinafter simply referred to as a lower electrode in a case where they are not necessary be distinguished particularly), and forming fluorine (fluoro-radicals) from the member per se into plasmas.

According to the manufacturing method of the semiconductor optical device of the invention, an oxygen-argon gas mixture is used but a fluorine gas is not used as a main etching gas in the dry etching step.

According to the invention, reaction products on the semiconductor substrate can be removed uniformly at a good efficiency during the etching back step for the organic material film. Therefore, a sufficient contact can be made between the contact layer and the upper electrode upon formation of the upper electrode in the succeeding step. Accordingly, the problem of lowering the yield such as failure of the threshold value and lowering of the reliability due to increase of the device resistance is not caused.

Then, according to the invention, the efficiency of removing the products can be improved and a highly reliable high quality semiconductor optical device can be provided.

According to the invention, reaction products can be removed more efficiently and stably than in a case of using only the fluorine gas as the existent method by the effect of fluoro-radicals formed from the fluorine-containing member.

Further, according to another embodiment of the invention, since only the solid material is used without using the fluoric gas, the amount of use for the fluoric gas which is a green house gas per one month can be reduced from 20 liter/month to zero compared with the removal of the reaction products using the fluoric gas in the prior art. Further, gas reservoirs, the cylinder cabinet, gas flow meters, and on-off valves are no more necessary to facilitate conveyance and a semiconductor optical device can be manufactured simply, safely and at a reduced cost.

Further, by the use of the semiconductor optical device manufactured by the method described above, the capacity of the optical communication system can be increased.

BRIEF DESCRIPTION OF THE DRAWINGS

FIG. 3 is a view showing a flow for manufacturing an InP series ridge waveguide channel semiconductor laser according to Example 1 of the invention;

FIG. 12 is a flow chart for manufacturing a ridge waveguide channel type semiconductor laser according to an existent example.

DESCRIPTION OF THE PREFERRED EMBODIMENT

The present invention is to be described more specifically by way of examples.

EXAMPLE 1

The invention to be described with reference to FIG. 1 to FIG. 5.

Figure 1:
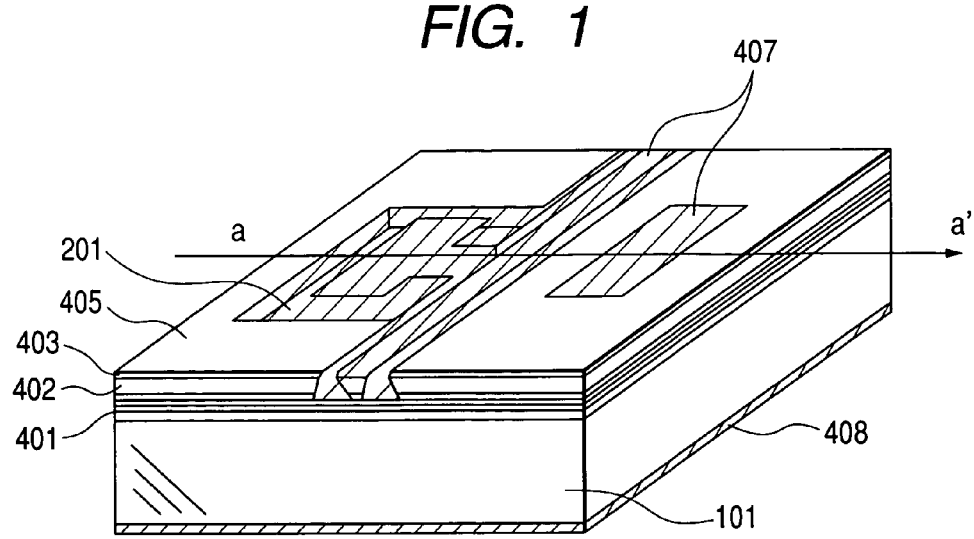
FIG. 1 is an outer view for a device of a ridge waveguide channel type semiconductor laser manufactured by a method according to the present invention.

FIG. 1 is a perspective view showing the entire constitution of an InP series ridge waveguide channel type semiconductor laser manufactured by the method according to the invention. In the semiconductor laser, a multi-layered structure comprising an active layer 401, an InP clad layer 402 and a contact layer 403 are formed on an InP substrate 101 for forming an optical waveguide channel, in which the contact layer 403 is fabricated into a stripe structure with a width of 2.0 μm and a trench width on both sides of 10 μm. The InP clad layer 402 is formed into a ridge waveguide channel of an inverted mesa cross sectional shape. A passivation film 405 of 0.5 μm thickness is formed over the entire substrate. Planarized polyimide resin 201 is present in the trenches on both sides of the ridge. The upper electrode 407 of about 1 μm thickness is formed of Ti/Pt/Au. Numeral 408 denotes a lower electrode.

Figure 2:
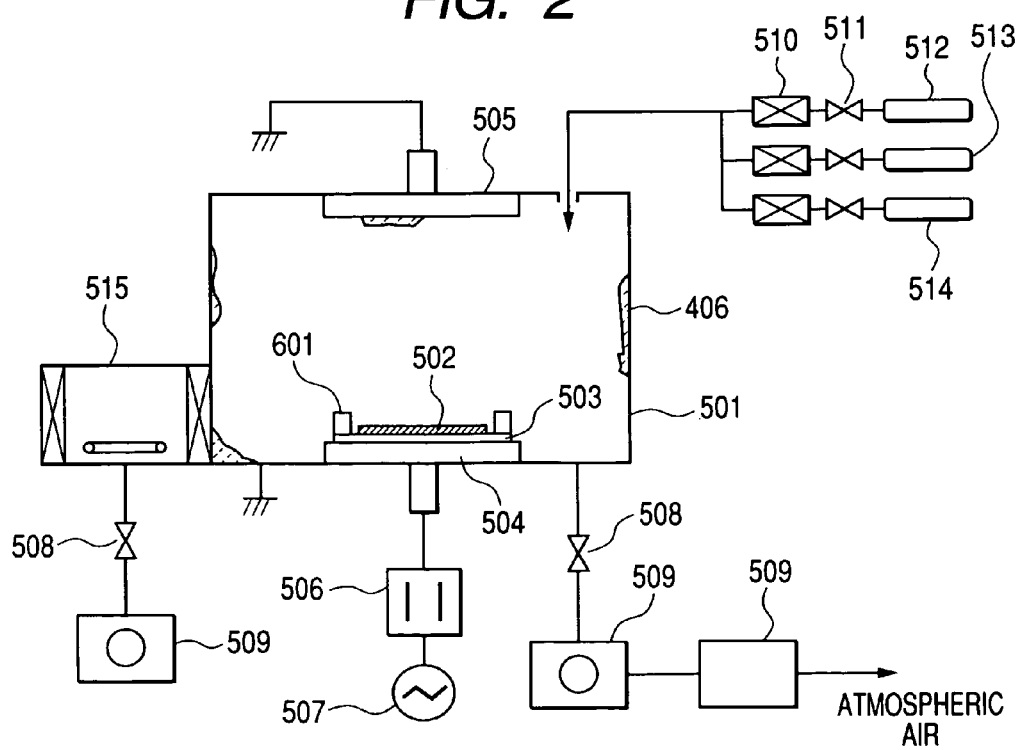
FIG. 2 is a schematic view showing a dry etching apparatus of Example 1 according to the invention.

FIG. 2 is a schematic view of a dry etching apparatus used for the method of manufacturing a semiconductor laser shown in FIG. 1 according to Embodiment 1 of the invention. The dry etching apparatus has a lower electrode 504 that also serves as a holder for tray 503 for transportation of the semiconductor substrate 502 or a wafer and an upper electrode 505 opposed to the lower electrode 504 in a reaction chamber 501. The lower electrode 504 is connected by way of a matching box 506 with an RF power supply 507. In the reaction chamber 501, an exhaustion device 509 connected by way of an on-off valve 508 lo with an evacuation pump is laid in a reaction chamber 501 and a pipeline of a gas supply portion is connected. The gas supply portion includes an oxygen reservoir 512, an argon reservoir 513 and a fluoric gas reservoir 514 for supplying a predetermined amount of a reaction gas by way of gas flow meters 510 and on-off valves 511. Further, the gas reservoirs are installed in a cylinder cabinet for safety. A fluorine-containing member 601 is previously disposed to the periphery of the semiconductor substrate 502 disposed on the lower electrode 504 or the tray 503 for wafer transportation of the dry etching apparatus.

As the fluorine-containing member 601, an engineering plastic (for example, teflon) is preferably used for facilitating the formation of the shape.

FIG. 3 shows a flow for manufacturing a semiconductor laser, that is, an InP series ridge waveguide channel type semiconductor laser with a polyimide resin 201 being buried on both sides of a ridge.

At first, after forming a multi-layered structure comprising an active layer 401, an InP clad layer 402 and a contact layer 403 over an InP substrate 101 for forming the optical waveguide channel, the contact layer 403 is fabricated into a stripe structure with a stripe width of 2.0 μm and a trench width on both sides of the stripe of 10 μm by using a CVD oxide film of 100 nm (hereinafter referred to as $SiO_2$ film) 404 as a mask. Successively, the InP clad layer 402 is etched using wet etching with a liquid mixture of hydrochloric acid and phosphoric acid to form a ridge waveguide channel of an inverted mesa cross section shape as shown in FIG. 3(B). Then, a passivation film 405 of 0.5 μm thickness is formed over the entire substrate by a CVD method. Then, a polyimide resin 201 is coated over the entire substrate (FIG. 3(C)).

Then, by using the dry etching apparatus showing in FIG. 2, the polyimide resin 201 in the trenches on both sides of the ridge is planarized and the polyimide resin 201 in the portions other than the trenches on both sides of the ridge waveguide channel are completely removed by an etching back method using an oxygen-argon gas mixture with addition of a fluoric gas (FIG. 3(D)).

Then, the passivation film 405 in the current injection region ridge waveguide channel is removed. Then, an upper electrode 407 of about 1 μm thickness comprising Ti/Pt/Au is formed by an EB vapor deposition method. Then, after patterning the upper electrode 407 by ion milling, it is past through the steps of rear face polishing, formation of lower electrode 408 and electrode alloying (FIG. 3(E)). After passing through the steps, the wafer is cleaved into a bar-shape with a 200 μm cavity and, after forming reflection protective film on the cleaved surface, it is separated into devices each in a chip-like shape.

The thus manufactured ridge waveguide channel type semiconductor laser is shown in FIG. 1.

It is one of the features of the invention to conduct the etching back step for the polyimide resin (FIG. 3(D)) in the dry etching apparatus shown in FIG. 2.

Figure 4:
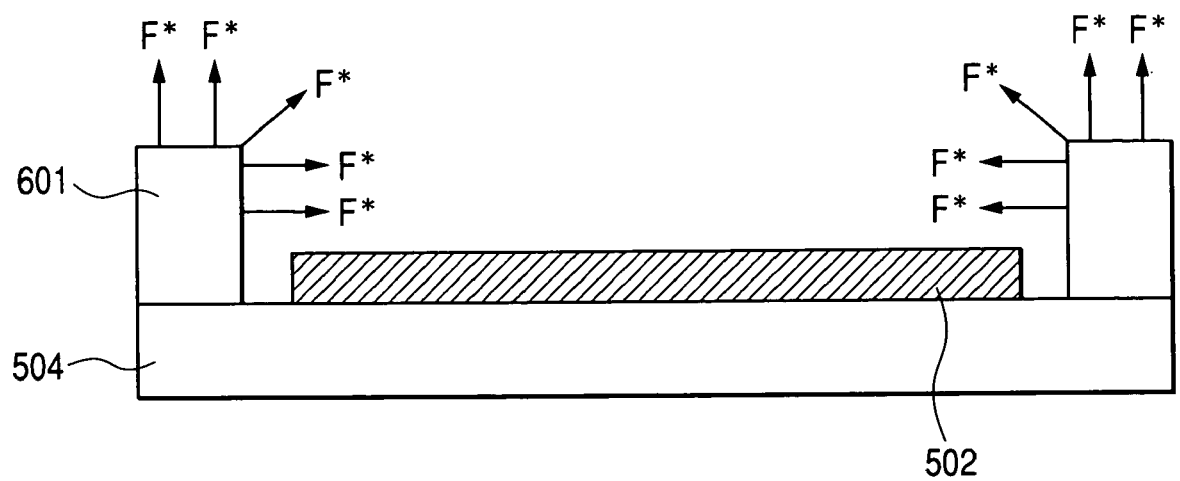
FIG. 4 is a cross sectional view for a teflon material and a semiconductor substrate in Example 1 of the invention.

FIG. 4 is a view showing a portion for the electrode of the dry etching apparatus in FIG. 2 in an enlarged scale. A fluorine-containing member, for example, a teflon member 601 is previously disposed to the periphery of a semiconductor substrate 502 disposed on the lower electrode 504 or a tray 503 for the wafer transportation in the dry etching apparatus.

Figure 5:
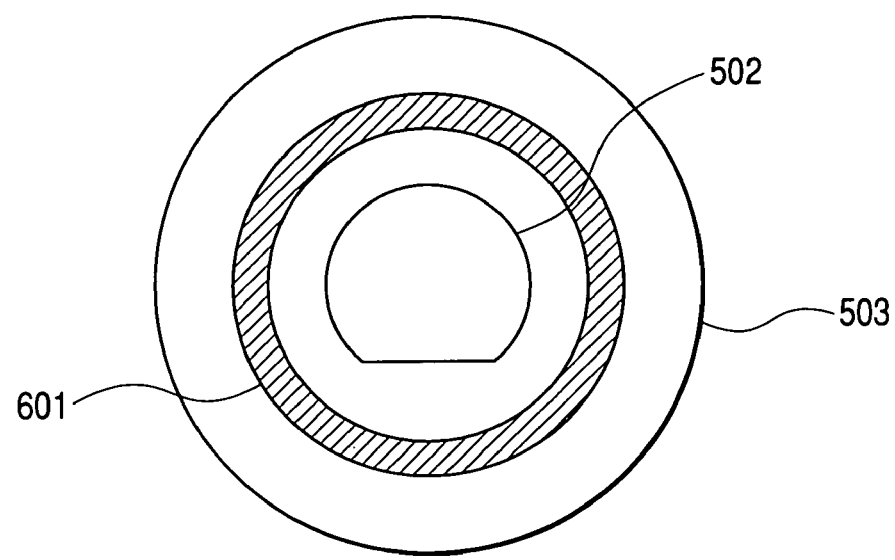
FIG. 5 is a view showing the arrangement of a teflon material in Examples 1 and 3 of the invention.

The fluorine-containing member is disposed, for example, in a ring-shape along the periphery of the semiconductor substrate. That is, as shown in FIG. 5, a ring-like teflon member 601 is disposed to the periphery of the semiconductor substrate 502 disposed on the lower electrode or the tray 503 for wafer transportation.

The height HT of the teflon member 601 is sufficiently higher than the height HS of the semiconductor substrate 502. For example, while HS is 500 μm, HT is 20 μm.

Further, the radial thickness of the ring-shaped teflon member 601 is, for example, 10 mm. Further, the diameter D2 of the ring-shape teflon member 601 is desirably larger than the diameter D1 of the semiconductor substrate 502 within a range of 1 cm. That is, the gap G between the inner circumference of the teflon member 601 and the outer circumference of the semiconductor substrate 502 is made small. As an example, while the diameter of the semiconductor substrate 502 is 50 mm, G is 0 to 5 mm.

Thus, the fluoro radicals F* are uniform within the plane of the semiconductor substrate and reaction products can be removed more stably.

According to the invention, since the ring-shape teflon member 601 is disposed to the periphery of the semiconductor substrate 502, the teflon surface is excited by Ar ions or $O_2$ ions and fluoro-radicals F* are supplied also from the ring-shape teflon material 601 per se during dry etching in the etching back step for polyimide resin using the fluoric gas.

Reaction products deposited on the semiconductor substrate 502 can be efficiently removed uniformly by the fluoro-radicals F*.

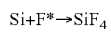

Succeeding to the etching back step, an upper electrode 407 of about 1 μm thickness comprising Ti/Pt/Au is formed on the semiconductor substrate 502 by an EB vapor deposition method. Then, after patterning the upper electrode 407 by ion milling, it was passed through the steps of rear face polishing, formation of the lower electrode 408 and electrode alloying (FIG. 3(E)). After passing through the steps, the wafer is cleaved into the bar-shape with a 200 μm cavity and, after forming a reflection productive film on the cleaved surface, it is separated into chip-shape devices.

Figure 11:
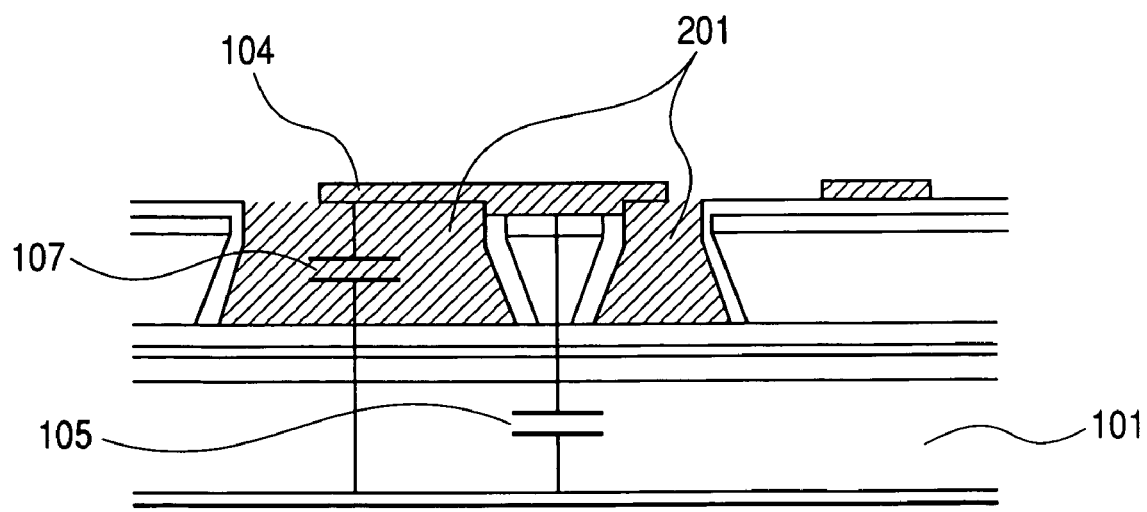
FIG. 11 is a cross sectional view in the direction of a mesa stripe of a ridge waveguide channel semiconductor optical device as the object of the invention and the existent example.
Figure 13:
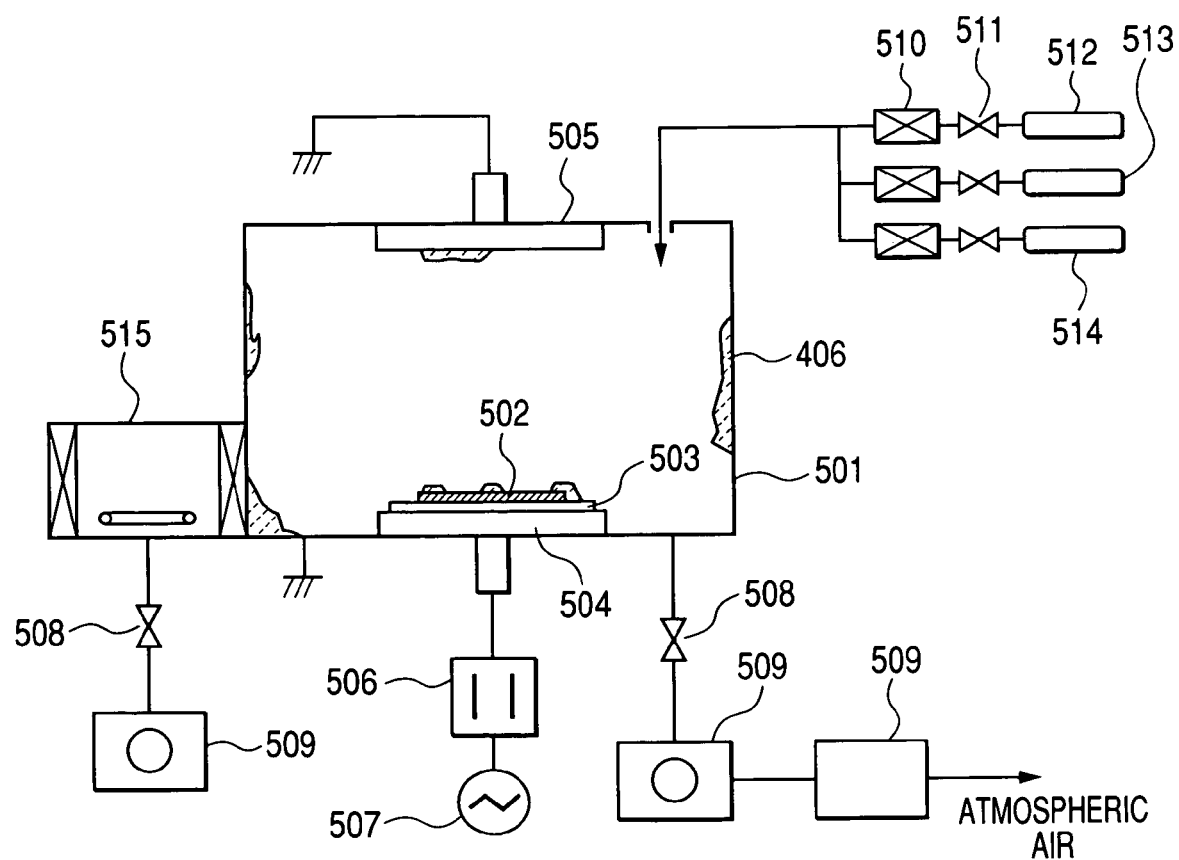
FIG. 13 is a schematic view showing a dry etching apparatus using a fluoric gas according to the existent example.

As described above, as shown in FIG. 11, a ridge waveguide channel type semiconductor optical device as shown in FIG. 11 is manufactured.

According to the invention, since the fluoro-radicals F* are supplied also from the ring-shape teflon member 601 during the etching back step of the polyimide resin, reaction products 406 on the contact layer 403 and the polyimide resin 201 of the semiconductor substrate are efficiently removed uniformly and residues of the reaction products 406 can be eliminated. Therefore, a sufficient contact can be made between the contact layer 403 and the upper electrode 407 upon formation of the upper electrode 407 in the succeeding step. Accordingly, the problem of lowering the yield such as failure of the threshold value or lowering of the reliability due to increase of the device resistance is not caused.

As a result of evaluation for the laser characteristics of the optical device manufactured in this example, it has been confirmed that the device oscillates at a threshold current of 12 mA, there are no contact resistance failure or film peeling due to the residues of reaction products and the reaction products on the semiconductor substrate can be removed completely, and the quality of the device could be improved outstandingly.

The fluorine-containing member is made of an engineering plastic (for example, teflon 601) which is easy for the fabrication of shape but it may be silicon or SiC previously doped with fluorine. Further, while the InP substrate is used in this invention, it will be apparent that quite the same effect as described above can be obtained also by using an Si or GaAs substrate.

EXAMPLE 2

In this example, reaction products deposited on a semiconductor substrate are removed only by fluorine (fluoro-radicals F*) generated from the fluorine-containing member 601 per se into the plasmas, instead of using the fluoric gas in the etching back step of the polyimide resin in Example 1 described above.

Figure 6:
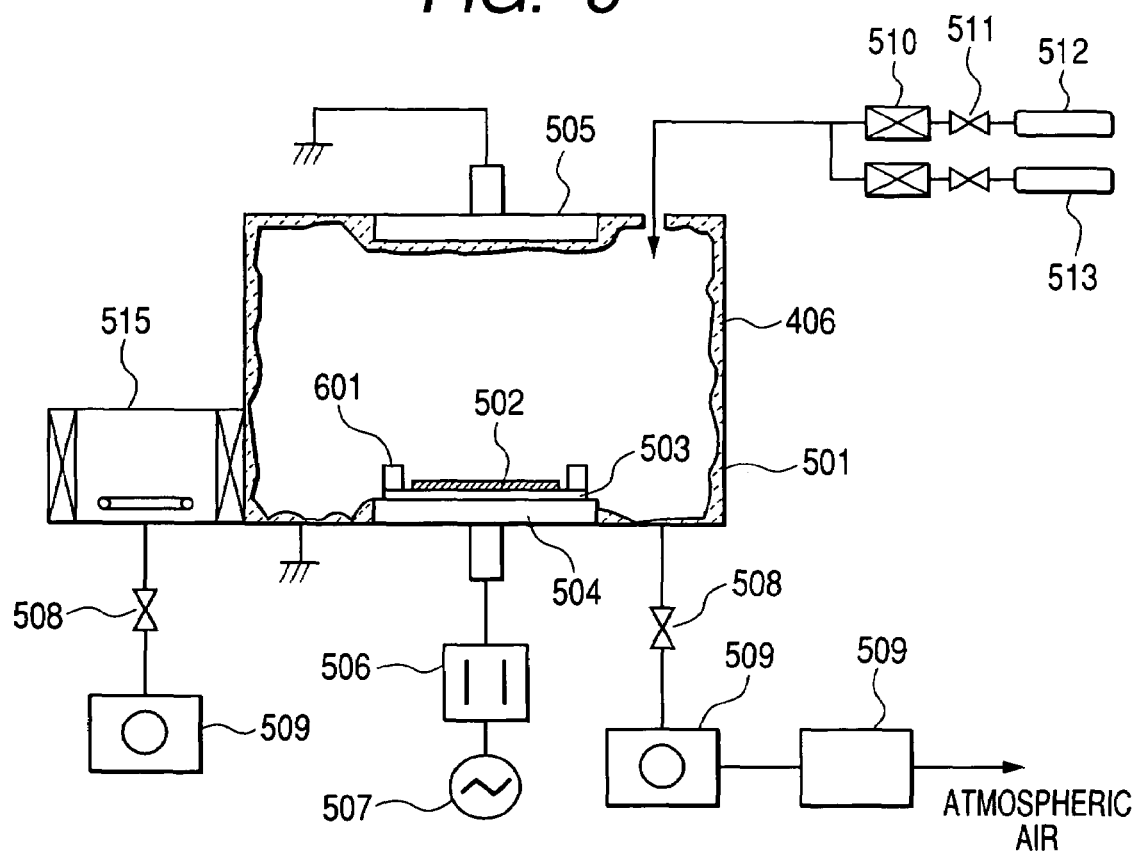
FIG. 6 is a schematic view showing a dry etching apparatus for Example 2 of the invention.

FIG. 6 shows a schematic view of a dry etching apparatus used in this example. The apparatus has a structure in which a ring-shape teflon material 601 is disposed on a lower electrode 504 without using a fluoric gas. Accordingly, the cylinder cabinet, the gas reservoir 514, the gas flow meter 510 and the on-off valve 511 can be saved each by one.

In this method, since the fluoric gas is not used, reaction products 406 deposited to the member in the reaction chamber can not be removed completely. However, since this is a structure in which the fluoro-radicals F* generated from the fluorine-containing member per se are present at a high density to the periphery of the semiconductor substrate 502, the reaction products 406 deposited on the semiconductor substrate 502 can be completely removed.

This can remove the reaction products 406 on the contact layer 403 and the polyimide resin 201 over the semiconductor substrate efficiently and uniformly during the etching back step of the polyimide resin. Accordingly, in the formation of the upper electrode 407 in the succeeding step, a sufficient contact can be made between the contact layer 403 and the upper electrode 407. Accordingly, there is no problem of lowering the yield such as failure of the threshold value or lowering of the reliability due to the increase of the device resistance.

Further, a high quality semiconductor optical device can be obtained at a reduced cost without using the fluoric gas which is the global green house gas.

EXAMPLE 3

In this example, the thickness of teflon disposed to the periphery of the semiconductor substrate in Example 1 or 2 is made larger than the thickness of the semiconductor substrate 502. This is to be described with reference to FIG. 5.

Since the thickness Tt for the teflon material 601 is larger than the thickness Ts for the semiconductor substrate 502, the reaction products on the semiconductor substrate 501 can be removed efficiently and stably by the fluoro-radicals generated form the side wall of the teflon 601.

EXAMPLE 4

Figure 7:
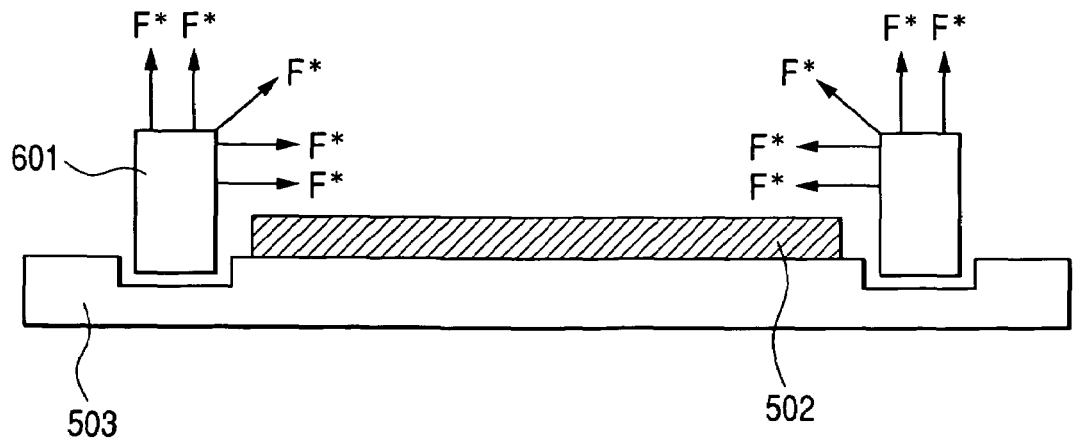
FIG. 7 is a cross sectional view of a teflon material and semiconductor substrate showing Example 4 of the invention.

In this example, the lower electrode or the tray for wafer transportation and the teflon member disposed in the ring-shape which were separate members in Examples 1 to 3 are integrated. This is to be described with reference to FIG. 7.

A groove capable of fixing a ring-shape teflon member 601 is formed to a lower electrode 504 or a tray 503 for wafer transportation. This can prevent positional displacement of the ring-shaped teflon member 601 and reaction products on the semiconductor substrate 502 can be removed stably.

EXAMPLE 5

Figure 8:
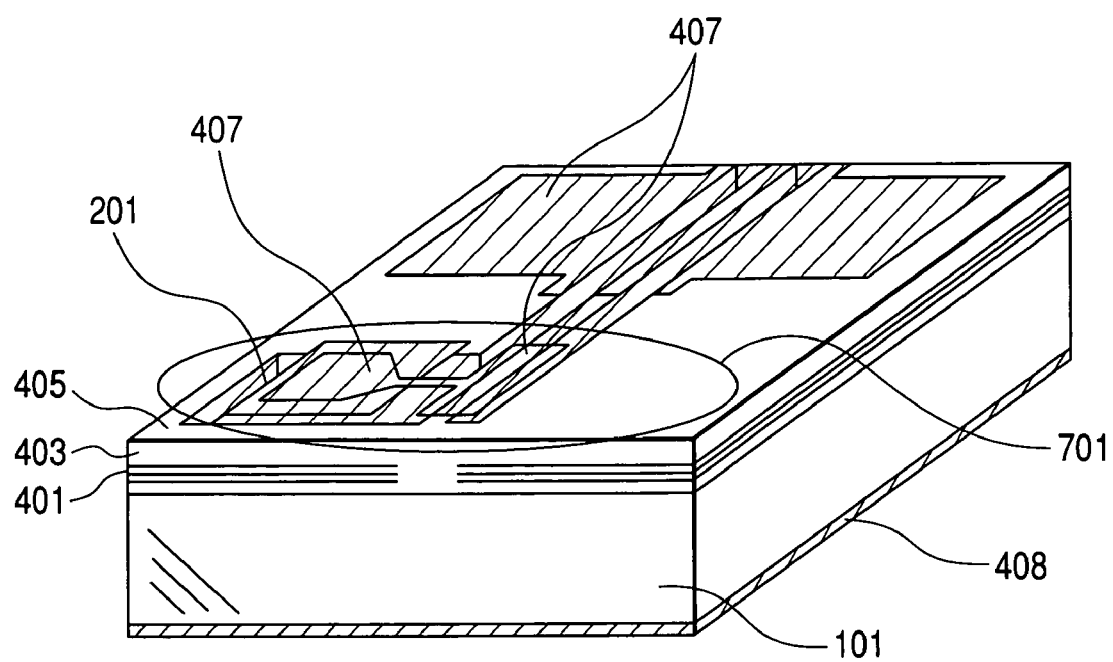
FIG. 8 is an outer view of a device of a ridge waveguide channel type modulator integrated laser showing Example 5 of the invention.

In this example, a plurality of semiconductor optical devices such as a semiconductor laser and an EA modifier 701 manufactured in the method described in Examples 1 to 4 are integrated. FIG. 8 shows an outer view of a device for a ridge waveguide channel type modifier integrated laser in this example. The ridge waveguide channel type modifier integrated laser can be manufactured by the same process as in Examples 1 to 4.

The capacity of the optical communication system can be increased by using the semiconductor optical device manufactured by the method according to the invention.

EXAMPLE 6

Figure 9:
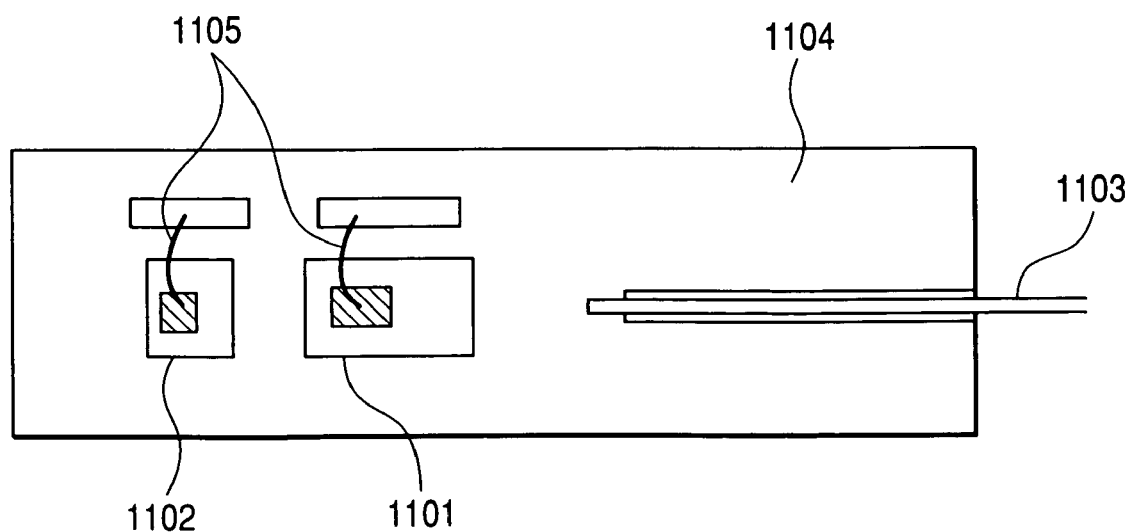
FIG. 9 is a view showing an optical module mounting a semiconductor laser according to the invention showing Example 6 of the invention.
Figure 10:
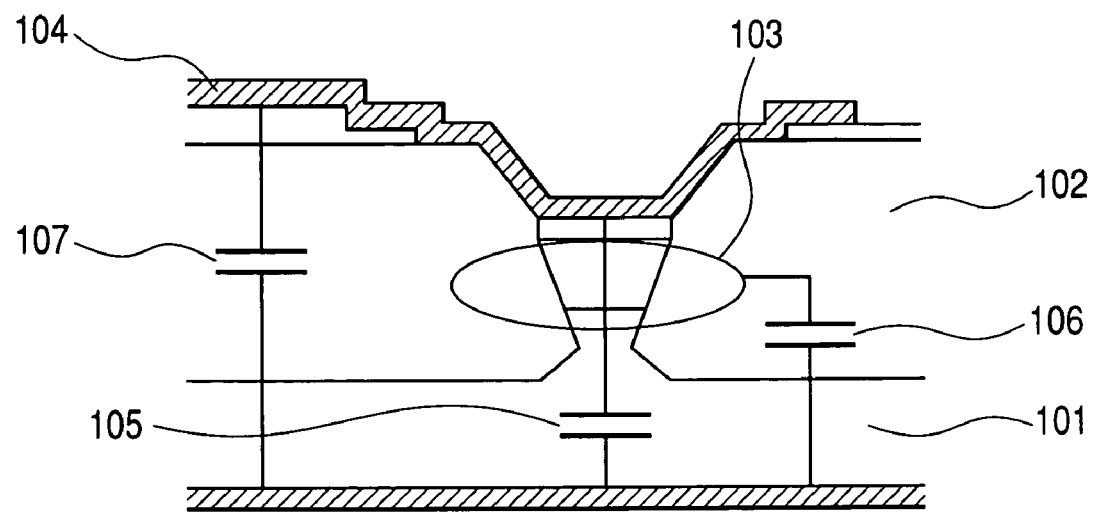
FIG. 10 is a cross sectional view in the direction of a mesa stripe of a buried hetero-type semiconductor optical device in an existent example.

FIG. 9 shows Example 6. In this example, a semiconductor laser 1101 and a waveguide channel photoreceiving device 1102 manufactured according to the method described in Examples 1 to 4 are manufactured as an optical module mounted on a silicon substrate 1104 to which an optical fiber 1103 is attached. An Au wire 1105 is bonded to each of the semiconductor laser 1101 and the waveguide channel photoreceiving device 1102 respectively and connected with the silicon substrate 1104.

The capacity of the optical communication system can be increased by using the semiconductor optical device manufactured by the method according to the invention.

As has been described above, the invention can provide a high quality semiconductor optical device capable of coping with the demand for the increase of the transmission capacity of the optical communication, which is utilizable to a laser module, a modifier module and an optical receiving module capable of conducting high speed operation.

What is claimed is:

1. A method of manufacturing a semiconductor optical device comprising the steps of:
   forming a ridge waveguide channel with a trench on both sides of the ridge waveguide channel on a semiconductor substrate;
   forming a passivation film on the semiconductor substrate containing the ridge waveguide channel and said trench on both sides;
   forming an organic material film on the passivation film;
   mounting the semiconductor substrate on a lower electrode of a dry etching apparatus, removing the organic material film by planarizing a portion of the organic material film outside of said trench while leaving another portion of the organic material film only within said trench by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film in the ridge waveguide channel by dry etching succeeding to the step of removing the organic material film; and
   forming an electrode to the region from which the passivation film has been removed.

2. A method of manufacturing a semiconductor optical device according to claim 1, comprising the steps of:
   forming a ridge waveguide channel of an inverted mesa cross sectional shape with a trench on both sides of the ridge waveguide channel on the semiconductor substrate;
   forming a passivation film on the semiconductor substrate and forming an organic material film while sandwiching both sides of the inverted mesa cross sectional shape on the passivation film;
   mounting the semiconductor substrate on a lower electrode of a dry etching apparatus, by planarizing a portion of the organic material film outside of said trench while leaving another portion of the organic material film only within said trench by etching, and, simultaneously, removing reaction products deposited on the semiconductor substrate accompanying removal of the organic material film by fluoro-radicals formed in plasmas from the fluorine-containing member disposed to the outer periphery of the substrate mounting surface of the lower electrode;
   removing the passivation film in the ridge waveguide channel by dry etching succeeding to the removing step for the organic material film and the reaction products; and
   forming an upper electrode to be connected with the ridge waveguide channel.

3. A method of manufacturing a semiconductor optical device comprising the steps of:
   forming a ridge waveguide channel on a semiconductor substrate;
   forming a passivation film on the semiconductor substrate containing the ridge waveguide channel;
   forming an organic material film on the passivation film;
   mounting the semiconductor substrate on a lower electrode of a dry etching apparatus, removing the organic material film in the portions outside of the trench of the ridge waveguide channel by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film in the ridge waveguide channel by dry etching succeeding to the step of removing the organic material film; and
   forming an electrode to the region from which the passivation film has been removed,
   wherein an oxygen/argon gas mixture is used and a fluoric gas is not used as a main etching gas in the dry etching apparatus used for the step of removing the organic material film and the reaction products.

4. A method of manufacturing a semiconductor optical device comprising the steps of:
   forming a ridge waveguide channel on a semiconductor substrate;
   forming a passivation film on the semiconductor substrate containing the ridge waveguide channel;
   forming an organic material film on the passivation film;
   mounting the semiconductor substrate on a lower electrode of a dry etching apparatus, removing the organic material film in the portions outside of the trench of the ridge waveguide channel by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film in the ridge waveguide channel by dry etching succeeding to the step of removing the organic material film; and
   forming an electrode to the region from which the passivation film has been removed,
   wherein the organic material film is formed of a polyimide resin.

5. A method of manufacturing a semiconductor optical device according to claim 1, wherein a main material for the fluorine-containing member is an organic material.

6. A method of manufacturing a semiconductor optical device comprising the steps of:
   forming a ridge waveguide channel on a semiconductor substrate;
   forming a passivation film on the semiconductor substrate containing the ridge waveguide channel;
   forming an organic material film on the passivation film:
   mounting the semiconductor substrate on a lower electrode of a dry etching apparatus, removing the organic material film In the portions outside of the trench of the ridge waveguide channel by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film in the ridge waveguide channel by dry etching succeeding to the step of removing the organic material film; and
   forming an electrode to the region from which the passivation film has been removed,
   wherein a main material for the fluorine-containing member is silicon or SiC.

7. A method of manufacturing a semiconductor optical device comprising the steps of:
   forming a ridge waveguide channel on a semiconductor substrate;
   forming a passivation film on the semiconductor substrate containing the ridge waveguide channel;
   forming an organic material film on the passivation film;
   mounting the semiconductor substrate on a lower electrode of a dry etching apparatus, removing the organic material film in the portions outside of the trench of the ridge waveguide channel by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film in the ridge waveguide channel by dry etching succeeding to the step of removing the organic material film; and
   forming an electrode to the region from which the passivation film has been removed,
   wherein the fluorine-containing member is disposed in a ring-shape to the periphery of the substrate mounting surface of the lower electrode.

8. A method of manufacturing a semiconductor optical device comprising the steps of:
   forming a ridge waveguide channel on a semiconductor substrate;
   forming a passivation film on the semiconductor substrate containing the ridge waveguide channel;
   forming an organic material film on the passivation film;
   mounting the semiconductor substrate on a lower electrode of a dry etching apparatus, removing the organic material film in the portions outside of the trench of the ridge waveguide channel by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film in the ridge waveguide channel by dry etching succeeding to the step of removing the organic material film; and
   forming an electrode to the region from which the passivation film has been removed,
   wherein a thickness of the fluorine-containing member is larger than the thickness of the semiconductor substrate.

9. A method of manufacturing a semiconductor optical device comprising the steps of:
   forming a ridge waveguide channel on a semiconductor substrate;
   forming a passivation film on the semiconductor substrate containing the ridge waveguide channel;
   forming an organic material film on the passivation film;
   mounting the semiconductor substrate on a lower electrode of a dry etching apparatus, removing the organic material film in the portions outside of the trench of the ridge waveguide channel by etching and, simultaneously, removing reaction products deposited on the semiconductor substrate accompanying removal of the organic material film with fluoro-radicals formed in plasmas from a fluorine-containing member disposed to the outer periphery of the substrate mounting surface of the lower electrode;
   removing the passivation film In the ridge waveguide channel by dry etching succeeding to the step of removing the organic material film; and
   forming an electrode to the region from which the passivation film has been removed,
   wherein the lower electrode and fluorine-containing member are integrated.

* * * * *